United States Patent

Fukuhara et al.

[11] Patent Number: 4,473,287
[45] Date of Patent: Sep. 25, 1984

[54] FOCUS DETECTING DEVICE FOR CAMERA

[75] Inventors: Toru Fukuhara, Isehara; Makoto Kimura, Tokyo, both of Japan

[73] Assignee: Nippon Kogaku K.K., Tokyo, Japan

[21] Appl. No.: 389,049

[22] Filed: Jun. 16, 1982

[30] Foreign Application Priority Data

Jun. 22, 1981 [JP] Japan ................... 56-96157

[51] Int. Cl.³ .............................................. G03B 13/18
[52] U.S. Cl. ..................................... 354/409; 354/402
[58] Field of Search ................ 354/25 R, 25 A, 25 P, 354/25 N, 31, 31 F, 195, 400–409

[56] References Cited

U.S. PATENT DOCUMENTS 4,168,116 9/1979 Goldberg ..................... 354/195 X
4,344,679 8/1982 Yagi et al. ........................... 354/25

Primary Examiner—William B. Perkey
Attorney, Agent, or Firm—Shapiro and Shapiro

[57] ABSTRACT

Focus detecting device comprises a focus detecting optical system for guiding the light from an object onto a focus detecting plane, focus detecting means for identifying the focusing state from the image of the object formed on the focus detecting plane, means for generating a signal corresponding to the controlled actual F-number of the photographic optical system, means for generating a correction signal corresponding to the displacement of the optimum image plane of the photographing optical system according to the change of the controlled F-number, and means for correcting the output signal of the focus detecting means according to the correction signal.

10 Claims, 13 Drawing Figures

FOCUS DETECTING DEVICE FOR CAMERA

BACKGROUND OF THE INVENTION

1. Field of the Invention

The present invention relates to a focus detecting device for use in a photographic camera, and more particularly to such device capable of accurately detecting the focus of a photographic optical system.

2. Description of the Prior Art

For the purpose of detecting focus in a camera, there is already known a device for guiding the light from an object onto photoelectric converting means through a focus detecting optical system and identifying, by the output signal from said converting means, whether a photographic optical system is focused at a photographic film. In such a device, a focus detecting optical system utilizing the light passing through the photographic optical system has a constant F-number corresponding to a predetermined lens aperture. On the other hand, the aperture or F-number of the photographic optical system itself is varied manually or automatically according to the desired exposure and accordingly changes the position of the optimum image surface. No difficulty arises when the constant F-number of the focus detecting optical system coincides with the F-number of the photographic optical system at the time of film exposure, but since the F-numbers are mutually different in most cases, the optimum image surface of the photographic optical system at the time of film exposure is different from the position of the film surface even if the focusing state is correctly detected by the output signal from the photoelectric converting means. Thus the conventional focus detecting device cannot be utilized for precise focusing. Other known devices utilizing a focus detecting optical system independent from the photographic optical system have had a similar defect because of a fact that the F-number at the time of film exposure varies according to the brightness of the object at the exposure time.

SUMMARY OF THE INVENTION

The object of the present invention is to provide a focus detecting device for camera that does not suffer from the aforementioned drawbacks and that is capable of focus detection enabling precise focusing at the time of film exposure.

The above-mentioned object is achieved according to the present invention by a device comprising a focus detecting optical system for guiding the light from an object onto a focus detecting plane; focus detecting means for identifying the focusing state from the image of the object formed on said focus detecting plane; means for generating a signal corresponding to the controlled actual F-number of the photographic optical system; means for generating a correction signal corresponding to the displacement of the optimum image plane of said photographic optical system according to the change of said controlled F-number; and means for correcting the output signal of said focus detecting means according to said correction signal.

DESCRIPTION OF THE PREFERRED EMBODIMENTS

Now the present invention will be clarified in detail by embodiments thereof shown in the attached drawings.

Figure 1:
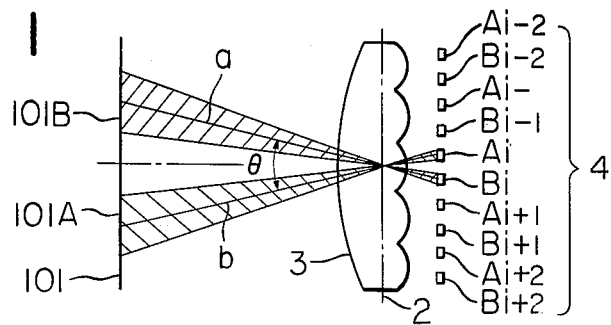
FIG. 1 is a schematic view of a lens and detectors of a focus detecting device applicable to the present invention.

FIG. 1 shows an embodiment of the focus detecting device, in which the light beams from two areas 101A, 101B symmetrical to the optical axis on the exit pupil 101 of a photographic lens 1 (see FIGS. 2, 4, and 6) are guided, through a lenslet array 3 positioned conjugate with the photographic film plane, to a self-scanning photoelectric array 4 such as a CCD image sensor or a MOS image sensor, and the focus is detected by the phase difference of the output signals from said array 4. The group A (A0 ... Ai ... An) and the group B (B0 ... Bi ... Bn) of said array 4, respectively receiving the light from the area 101A and 101B of the exit pupil 101, generate signals representing the object images formed by the light from respective areas. The central rays of the light from the areas 101A, 101B form an angle $\theta$. In the illustration, a plane 2 conjugate with the photographic film plane constitutes the focus detecting plane.

Figure 2:
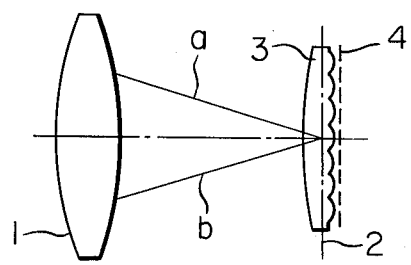
FIG. 2 is a view showing the optical path from an object point to detectors.
Figure 3:
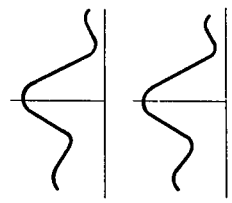
FIG. 3 is a waveform chart showing examples of output waveforms from the detectors shown in FIG. 2.

In a focused state, as shown in FIG. 2, two object images formed, at a position 2 conjugate with the film surface, by the light from two areas 101A, 101B of the exit pupil 101 mutually coincide on a plane perpendicular to the optical axis. Consequently the output signals from the groups A and B of the photoelectric array 4 mutually coincide as shown in FIG. 3.

Figure 4:
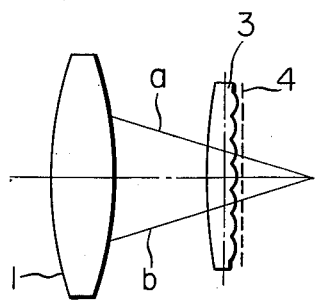
FIGS. 4 and 6 are views showing the optical paths respectively from a near object point and from a distant object point to detectors.
Figure 5:
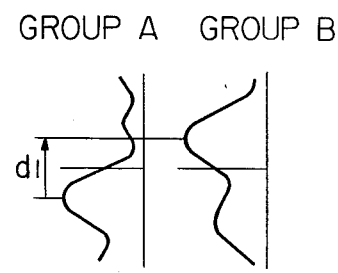
FIGS. 5 and 7 are waveform charts respectively corresponding to FIGS. 4 and 6.

On the other hand, in a rear focused state shown in FIG. 4, two object images formed by the light from the areas 101A, 101B of the exit pupil 101 are mutually shifted from the position 2 conjugate with the film surface. Consequently the output signals from the groups A and B of the photoelectric array 4 show a mutual phase difference d1 as shown in FIG. 5.

Figure 6:
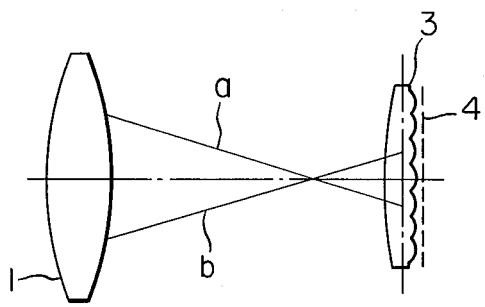
Figure 7:
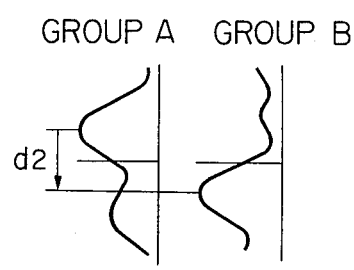

Also in a front focused state shown in FIG. 6, two object images formed by the light from the areas 101A, 101B of the exit pupil 101 show a displacement, from the position 2 conjugate with the film surface, in a direction opposite to that in the aforementioned rear focused state. Consequently the output signals from the groups A and B of the photoelectric array 4 show a mutual phase difference d2 opposite to that in the aforementioned rear focused state.

In this manner the focus detecting device explained above is capable of identifying the focused state when there is zero phase difference between the output signals from the groups A and B of the photoelectric array 4, or the rear or front focused state according to the sign of the phase difference. Furthermore the amount of displacement from the focused state can be detected from the amount of phase difference d1 or d2.

Figure 8:
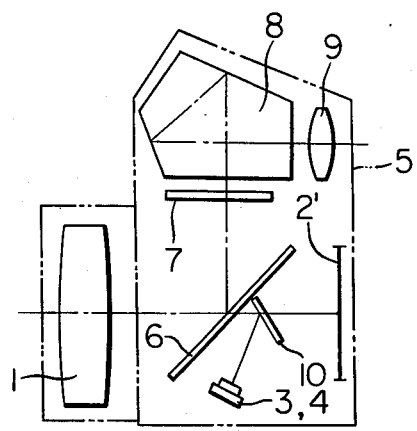
FIG. 8 is a schematic view of the device shown in FIG. 1 incorporated in a single-lens reflex camera.

FIG. 8 shows such a focus detecting device incorporated in a single-lens reflex camera, wherein a photographic lens 1 is detachable from a camera body 5. A quick-return mirror 6 has a semi-transparent area in the center to introduce reflected light to a view-finder optical system 7, 8, 9 and to guide transmitted light to an auxiliary mirror 10, which further guides the transmitted light to a lenslet array 3 and a photoelectric array 4 positioned at the bottom of the camera. 2' indicates the film surface. The lenslet array 3 and photoelectric array 4 are respectively in a position conjugate with the film plane 2' as explained above and in the vicinity thereof. The detection of focusing is conducted at the fully open aperture of the photographic lens, and the F-number of the focus detecting optical system is selected in such a manner that the light beam for focus detection is entirely contained in the exit pupil at the fully open aperture of any interchangeable lens. Consequently the F-number for focus detection remains constant regardless of the lens attached to the camera. More strictly, the F-number for focus detection is determined by the dimensions of the photoelectric converting elements, and by the directions and distances thereof to the lenslet array, etc.

Figure 9:
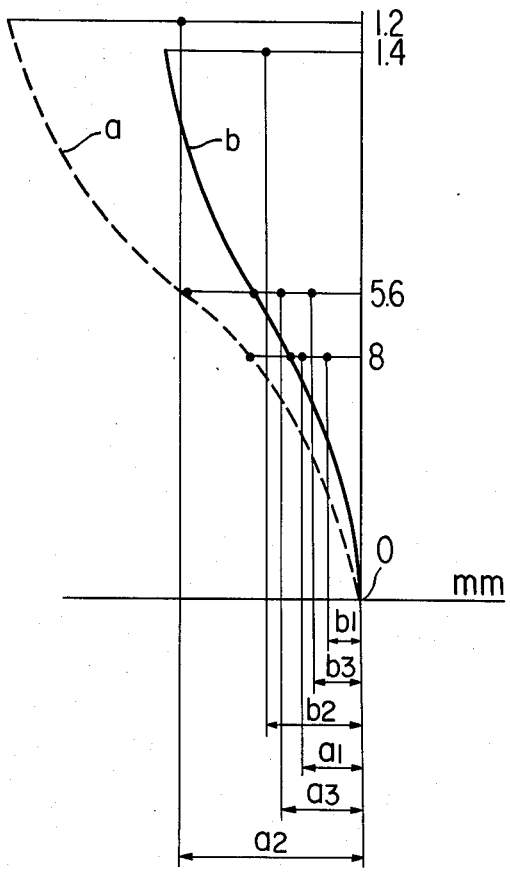
FIG. 9 is a chart showing the spherical aberrations of interchangeable lenses.

It is now assumed that the photographic lens mounted on the camera body 5 has a maximum aperture of F1.2 and has a spherical aberration as shown by a curve a in FIG. 9, and that the F-number for focus detection is conducted at F8. The detection conducted at the maximum aperture of the lens 1 identifies the focused state when the optimum image plane at an aperture F8 is positioned at the focus detecting plane 2, since the F-number for detecting the focusing state is constantly F8 regardless of the maximum aperture F1.2 of the lens 1. Stated differently the focus detecting plane 2 is positioned at the optimum image plane for F8, which is separated by a distance $a_1$ from the paraxial imaging point O as shown in FIG. 9. Upon the release of the shutter subsequent to the above-mentioned focusing state detection, the photographic lens is maintained in position and the lens diaphragm is reduced whereby the optimum image plane is displaced from a position $a_2$ corresponding to an aperture F1.2 toward the paraxial imaging point O. The diaphragm is stopped, for example at F5.6, for obtaining an appropriate exposure, so that the optimum image plane is separated in this state by a distance $a_3$ from the paraxial imaging point O. Thus the photoelectric array detects the optimum image plane at an aperture F8 but the diaphragm of the photographic lens is stopped at F5.6 at the moment of photograph taking, so that there will result a difference ($a_3 - a_1$) between the optimum image plane at F5.6 and the optimum image plane at focus detection. If the lens diaphragm is controlled to F8, the optimum image plane will be positioned at a distance $a_1$, which is the same as in focus detection, so that the optimum image plane of the lens 1 coincides exactly with the photographic film 2' to provide an accurately focused photograph. However, if the F-number at exposure is different from that in focus detection as explained above, the optimum image plane of the photographic lens 1 will be displaced from $a_1$ to $a_3$. Consequently the image recorded on the film is not precisely focused although the focusing state is correctly identified.

The following is an explanation of a case where the photographic lens 1 is replaced by different interchangeable lenses. It is assumed that a newly mounted photographic lens has a spherical aberration as shown by curve b in FIG. 9 and has a maximum aperture of F1.4. The F-number of the focus detecting optical system naturally remains at F8. For such a lens having a different aberration curve, the optimum image plane coincides with the focus detecting plane 2 at a distance $b_1$ from the paraxial imaging point O, assuming that the lenslet array 3 and the photoelectric array 4 are fixed on the camera body 5 and the F-number for focus detection is constant at F8. Thus the focus detecting plane 2 is positioned in this case at a distance $b_1$ from the paraxial imaging point O on the aberration chart shown in FIG. 9, and the detection of focusing state is thus conducted at that position. When the lens diaphragm is reduced after focus detection, the optimum image plane moves from a position of distance $b_2$ corresponding to the aperture F1.4 toward the paraxial imaging point O, so that the position of the optimum image plane $b_3$ corresponding to a diaphragm aperture for obtaining an appropriate exposure is different from said position $b_1$ by a distance ($b_3 - b_1$). Consequently a precisely focused image cannot be recorded on the film. When exposures are made through lenses having different aberration curves as shown by curves a and b in FIG. 9, even at the same F-number, the distance between the focus detecting plane 2 and the optimum image plane at the controlled F-number of the lens, i.e. the distance ($a_3 - a_1$) or ($b_3 - b_1$), varies depending on the lens. Stated differently, even when the detection of focusing state is conducted in a well-defined manner and the lens aperture is controlled to a predetermined F-number at the time of exposure, the distance between the optimum image plane at that F-number and the focus detecting plane varies according to the aberration curve of the lens.

Figure 10:
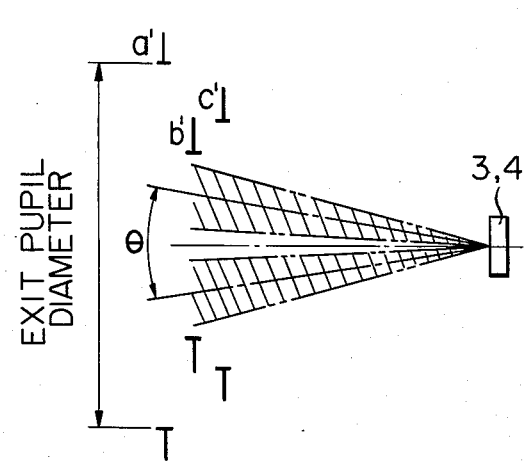
FIG. 10 is a chart showing the relationship between the exit pupil of an interchangeable lens at a fully open aperture and the constant F-number of the focus detecting optical system.

Furthermore, in order to enable detection of focusing for various interchangeable lenses, the light beams for detection have to be included in the maximum apertures of the lenses. FIG. 10 show the relationship of an exit pupil a' at the maximum aperture of a photographic lens a, an exit pupil b' at the maximum aperture of another lens b, an exit pupil c' at the maximum aperture of still another lens c, and the angle $\theta$ shown in FIG. 1, which corresponds to the F-number of the focus detecting optical system. That F-number inevitably assumes a relatively large value, since two light beams entering the lenslet array 3 with the mutual angle $\theta$ have to be included in all the exit pupils. Consequently the distance between the optimum image plane at the time of exposure and the film plane explained in FIG. 9 increases at as the F-number of the focus detecting optical system becomes larger and as the controlled F-number at the time of exposure becomes smaller.

The above-mentioned drawbacks can be resolved by an electronic processing system to be incorporated in the camera body 5 as will be explained in the following. Now referring to FIG. 11, the lenslet array 3 and the photoelectric array 4 are fixed at the bottom of the camera body 5. The F-number for focus detection is determined in such a manner that the light beams for detection are always included in the exit pupil at the maximum aperture of the mounted lens and remains therefore constant regardless of the photographic lens used. In the foregoing example the F-number is selected at F8. Consequently the photoelectric arrray 4 provides an output signal corresponding to an aperture F8 whereas the lens 1 is at the maximum aperture. A focus detecting circuit 11 receives the output signal from the photoelectric array 4 and detects the phase difference $d_1$ or $d_2$ between the signals from the group A elements ($A_0 \ldots A_i \ldots A_n$) and those from the group B elements ($B_0 \ldots B_i \ldots B_n$). A converting circuit 12 receives the signals from the focus detecting circuit 11 to calculate the amount of axial displacement of the optimum image plane from the focus detecting plane 2. An A/D converter 13 effects A/D conversion on the output signal from the converting circuit 12 to provide a digital signal representing the axial displacement of the optimum image plane. A signal generating circuit 14 identifies the type of mounted lens in response to a signal received from a signal pin 102 provided on the lens body, and generates a signal representing the lens type. In the case of the lenses shown in FIG. 9, the circuit 14 determines whether to follow the aberration curve a or b in response to the signal from the signal pin 102 and generates a signal representing the type of the lens. A signal generating circuit 15 generates a signal for manual diaphragm control in response to a signal from a signal pin displaced in conjunction with a diaphragm control ring on the lens. Also in the case of automatic diagragm control for appropriate exposure by an automatic exposure control circuit provided in the camera body 5, the signal generating circuit 15 generates a signal corresponding to the automatically controlled diaphragm aperture in response to a signal from the automatic exposure control circuit. In this manner the signal from circuit 15 corresponds to the F-number controlled at the time of exposure. A decoder 16 receives the signals from the signal generating circuits 14, 15 and generates a digital address signal in response to the aforementioned signals. A memory circuit 17 stores the distance between the optimum image plane of the photographic lens at the F-number for focus detection and that at the automatically controlled F-number, and generates a digital signal corresponding to that distance in response to the address signal received from decoder 16. Again referring to FIG. 9, the memory circuit 17 outputs a digital correction signal corresponding to ($a_3 - a_1$) or ($b_3 - b_1$) in response to the type and the controlled diaphragm aperture of the photographic lens mounted on the camera body 5. It is to be noted that the correction ($a_3 - a_1$) or ($b_3 - b_1$) remains substantially constant even when the photographic lens 1 is axially displaced to alter the imaging magnification. A correction circuit 18 adds the output signals from the A/D converting circuit 13 and from the memory circuit 17. The resulting output is composed of a signal corresponding the distance between the focus detecting plane 2 and the optimum image plane at the F-number for focus detection and of a correction signal corresponding to the distance between the optimum image plane at the F-number for focus detection and that at the controlled F-number, and represents therefore the amount of lens movement required for bringing the optimum image plane to the film plane 2' at the time of exposure.

A zero output signal from the correction circuit 18 indicates that the image is exactly focused at the film plane 2', while a non-zero digital signal indicates that the image is not exactly focused. A counter 19 is reset at the start of focus detection, so that a comparator circuit 20, receiving the signals from the correction circuit 18 and the counter 19, transmits the former as a digital output signal. A display circuit 21 drives a display unit 22 in response to the output signal from the correction circuit 18. Consequently the display unit 22 displays the amount and/or direction of the lens movement required to bring the optimum image plane to the film plane 2' at the time of exposure. A motor control circuit 23 drives a motor 24 for axially moving the lens 1 in response to the output signal from the comparator circuit 20. The rotating direction of the motor 24 is also controlled by the motor control circuit 23 in response to the output signal from the comparator circuit 20 in such a manner as to move the lens 1 in a direction bringing the optimum image plane at the time of exposure toward the film plane 2'. A pulse generator 25, provided with a light-emitting element 251 and a photosensor 252, generates pulse signals in response to the lens movement, and the pulse signals are counted by the counter 19. The comparator circuit 20 compares the digital signal from the correction circuit 18 with the count of the counter 19, and identifies the focused state, in which the optimum image plane at the time of exposure is positioned at the film plane 2', when the count coincides with the digital signal from the correction circuit 18. The display circuit 21 receives the output signal from the comparator circuit 20 during the lens movement, and the display unit 22 displays the amount and/or direction of lens movement to the focused state during the lens movement and then indicates that the focused state is reached. The motor control circuit 23 stops the motor 24 when the comparator circuit 20 provides a zero output signal indicating the focused state. Upon arrival at the focused state, the comparator circuit 20 generates a reset signal for resetting the counter 19 and a start signal to the focus detecting circuit 11 to re-start the detection of focusing state. In this manner the lens is constantly focused upon the object. The operator presses a shutter button to release the shutter after confirming the focused state by the display unit 22, whereby the diaphragm of the photographic lens is reduced from the maximum aperture to a determined F-number, followed by the lifting of the quick-return mirror 6 and the movement of shutter curtains. The film is exposed to the light in this manner, and the foregoing embodiment ensures exact focusing since the correction is always made to bring the optimum image plane to the film plane in response to the photographic lens in use and also to the F-number of the lens controlled at time of the exposure.

Although the foregoing embodiment is designed for automatic focusing, it is also possible to eliminate the motor control circuit 23 and the motor 24 from the aforementioned circuit and to attain the focused state by manual operation of a focusing ring of the lens. In such a case the display unit 22 can serve to indicate the direction of movement of the focusing ring, or the direction of lens movement.

It is also possible, by providing each photographic lens with a signal pin to be displaced in relation to the lens movement and providing the camera body 5 with a signal circuit varying the output signal in response to the lens movement in a similar manner as the circuit 14 or 15, to compensate the error in focusing resulting from lens movement through the decoder 16 which also receives the output signal.

Figure 11:
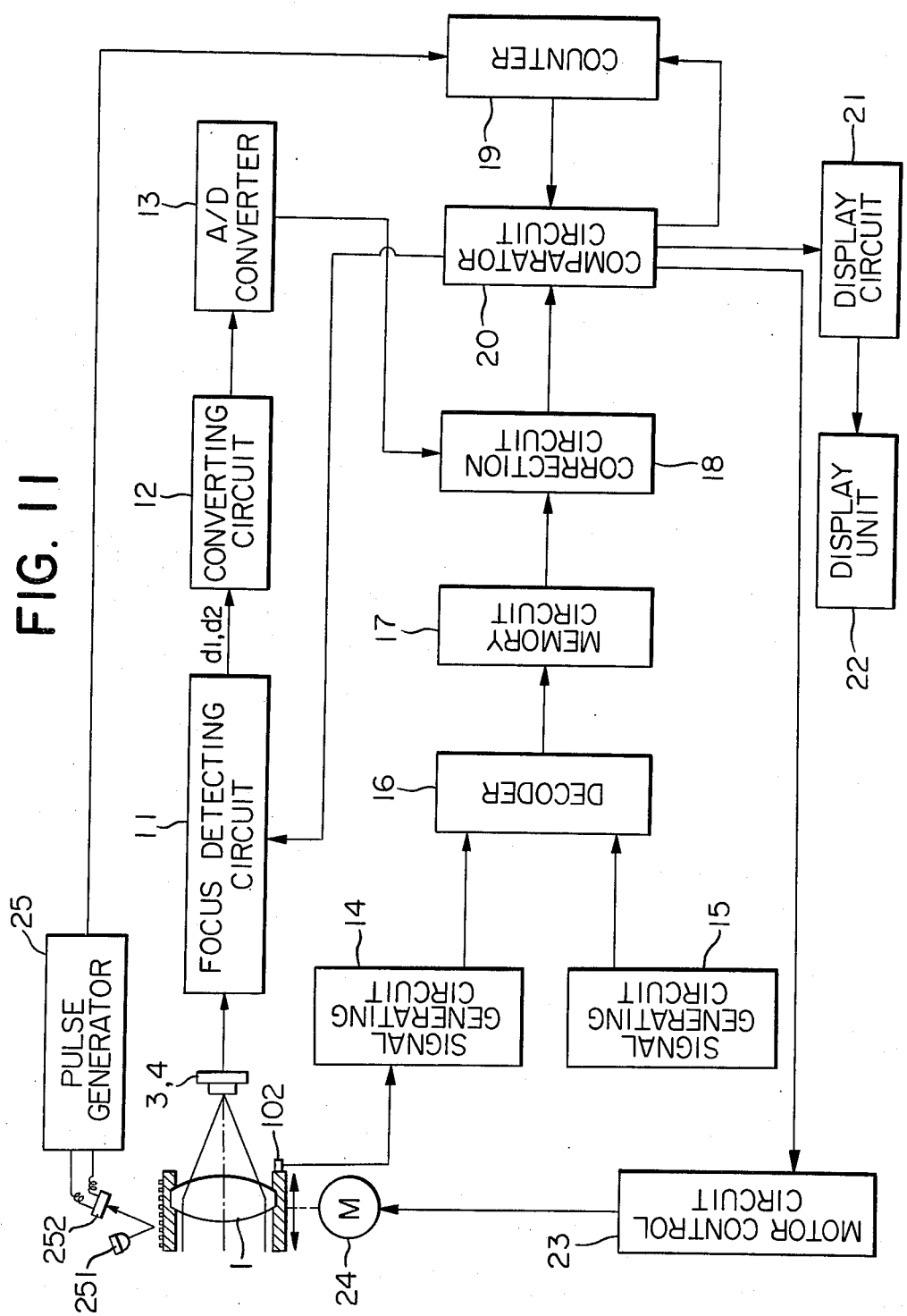
FIG. 11 is a block diagram of an electric processing circuit embodying the present invention.
Figure 12:
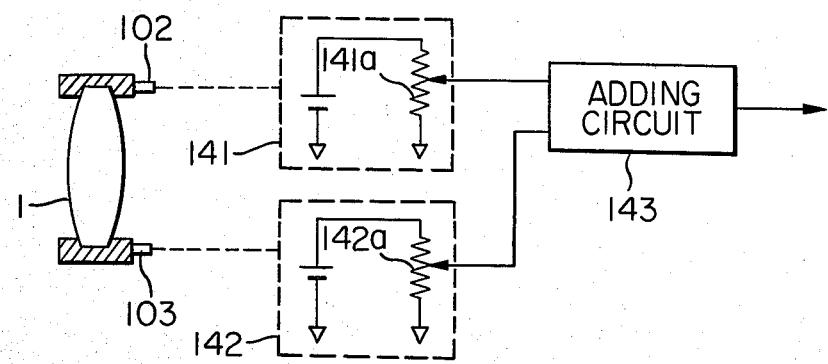
FIG. 12 is a diagram of a signal generating circuit representing another embodiment of the present invention.

In another embodiment shown in FIG. 12, the photographic lens 1 is provided, in addition to the aforementioned signal pin 102, with another signal pin 103 for indicating the focal length of said lens, and the signals from said signal pins are both transmitted to the camera body to identify the type of lens through the combination of signals. A signal generating circuit 141 comprises a variable resistor 141a changing the resistance thereof in response to the signal pin 102 indicating the F-number of maximum aperture of the lens mount on the camera body 5, and thus outputs a voltage corresponding to the maximum aperture of said lens. A signal generating circuit 142 comprises a variable resistor 142a changing the resistance thereof in response to the signal pin 103 indicating the focal length of the mounted lens, and thus outputs a voltage representing the focal length. An adding circuit 143 adds the output signals from the circuits 142 and 141 to provide an output signal similar to that from the signal generating circuit 14. Stated differently, circuits 141, 142 and 143 correspond to the circuit 14 shown in FIG. 11. The output signal from adding circuit 143 is supplied to the decoder 16 for processing similar to that already explained in relative to FIG. 16. In the present embodiment, lenses having the same focal length and the same maximum aperture are considered the same, so that the memory circuit 17 provides the same correction output signal for such lenses.

It is also possible to obtain the same signal from the circuit 14 for different photographic lenses having similar aberration curves. Naturally the output signal should vary for lenses having quite different aberration curves.

In foregoing embodiments the correction is made to bring the optimum image plane to the film plane in response to the lens diaphragm control at the time of exposure to any point from the maximum aperture to the minimum aperture. However, since the focus detecting optical system has a relatively large F-number as already explained in relation to FIG. 10, the amount of correction will generally become larger when the lens diaphragm is controlled to a smaller F-number. In consideration of this fact, it is also possible to apply the above-mentioned correction only in case the lens diaphragm is controlled to the minimum aperture or to a similar aperture.

The foregoing embodiments are applicable to detecting the focusing state of an object image formed by visible light or by infrared light and thus positioned the object image on the film plane. In the following there will be given an explanation of focus detection with infrared light and positioning of an infrared object image onto the film plane.

Figure 13:
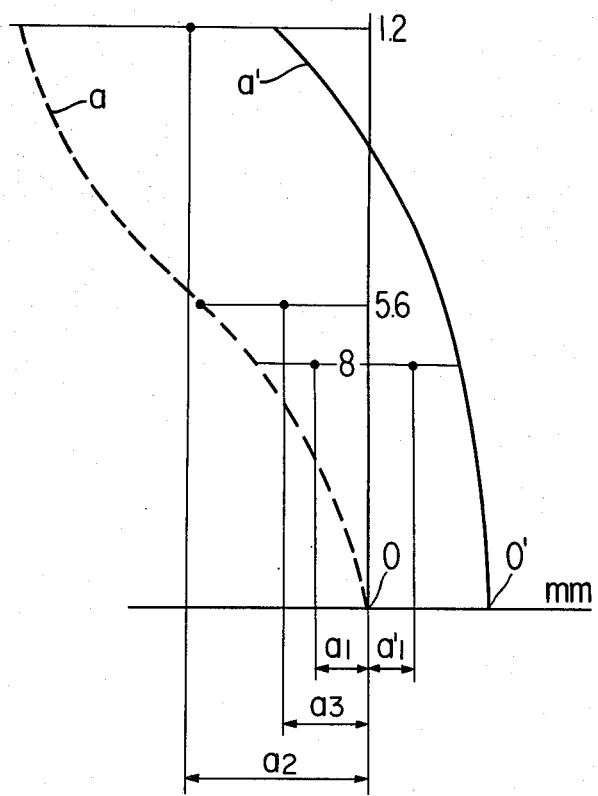
FIG. 13 is a chart showing aberrations in the infrared and visible wavelength regions.

If the photoelectric array 4 has a high infrared sensitivity, the focused state is identified when an optimum image plane of the infrared component contained in the light transmitted by the photographic lens 1 coincides with the focus detecting plane 2. However, because of the chromatic aberration of the optical system, infrared light and visible light provide different optimum image planes. For this reason the device shown in FIG. 11 or 12 is unable to position the optimum image plane of the visible component contained in the light transmitted by the photographic lens onto the film plane 2'. This difficulty can be prevented by determining the relationship between the optimum image plane $a'_1$ for infrared light at the F-number of the focus detecting optical system and the optimum image planes $a_1, a_2, a_3, \ldots$, for visible light at various controlled F-numbers at the time of exposure from the visible aberration curve $a$ and the infrared aberration curve $a'$ of the mounted lens as shown in FIG. 13 and thus calculating the distances of the optimum image planes for visible and infrared light $(a'_1+a_1), (a'_1+a_2), (a'_1+a_3), \ldots$ accordingly the amounts of correction, which are to be determined for each photographic lens to be mounted on the camera body, and the amounts of correction for different controlled F-numbers of different lenses are stored in the memory circuit 17. Thus, in response to the mounting of a photographic lens 1 on the camera body 5 and also to the determination of a controlled F-number, the signal generating circuits 14, 15 respectively transmit a signal for identifying the lens and another signal indicating the controlled F-number to the decoder 16, which in turn transmits a corresponding address signal to the memory circuit 17. In response to the address signal, the memory circuit 17 provides a digital signal indicating the aforementioned correction $(a'_1+a_3)$ corresponding to the mounted lens and to the controlled F-number. The A/D converting circuit 13 provides a digital signal representing the distance between the focus detecting plane 2 fixed in the camera body 5 and the optimum image plane for infrared light at the F-number for focus detection. The correction circuit 18 adds the output signals from the A/D converting circuit 13 and the memory circuit 17 to calculate the amount of lens movement required for bringing the optimum image plane at the controlled F-number to the film plane. Upon movement of the lens by that amount, the output signal of the correction circuit 18 coincides with that of the counter 19, whereby the comparator circuit 20 identifies the focused state and stops the motor 24. In this manner it is always possible to position the optimum image plane for visible light at the controlled F-number on the film plane, thus providing a precisely focused exposure, even when the focusing state is detected by infrared light. In such a case the circuits 11, 12 and 13 in FIG. 11 detect the focusing state of the infrared light through the focus detecting optical system, and the memory circuit 17 provides an output signal representing the amount of correction based on the distance between the optimum image planes of visible and infrared light through the optical system. The correction circuit 18, in response to the signals, provides an output signal for moving the lens to position the optimum image plane of visible light onto the film plane.

In the foregoing explanation the focusing state detecting device has been limited to a so-called TTL type in which detection is conducted by the light transmitted by the photographic lens, but it is naturally possible to replace it by a so-called external light detecting device which has a detecting optical system independent from the photographic lens. In such a case the F-number for focus detection does not exist, but the correction can be conducted in consideration of the displacement of the optimum image plane according to the controlled F-number of the lens for each photographic lens, since the focus detecting plane constituting a reference position for the detection is present at a predetermined position in the detecting optical system, corresponding to $a_1$ or $b_1$ in FIG. 9.

We claim:

1. In a camera system having an interchangeable lens barrel including therein a photographic optical system for positioning an optimum image plane of an object to be photographed in coincidence with a film plane, said optical system having optical characteristics in which the position of the optimum image plane varies in the direction of the optical axis depending on the F-number of the photographic optical system, and wherein a diaphragm aperture of the photographic optical system is reduced to a controlled F-number in response to a shutter releasing operation, an improvement comprising:

(a) a detecting optical system which is located rearwards of said photographic optical system for positioning the optimum image plane of the object on a predetermined surface, the detecting optical system having a fixed F-number;

(b) focal point detecting means for detecting the positional relation in the optical-axis direction between said predetermined surface and the optimum image plane of the object through said detecting optical system based upon a focused condition where the image of the object is formed on said predetermined surface, the focal point detecting means generating a positional signal representing the detected positional relation;

(c) means for detecting said controlled F-number of said photographic optical system to produce an F-number signal dependent upon the detected F-number;

(d) optical characteristics detecting means for detecting said optical characteristics to produce an optical characteristic signal dependent upon said detected optical characteristics;

(e) means for producing a distance signal representing the distance in the optical-axis direction between the optimum image plane of the object positioned by said photographic optical system at the controlled F-number and said film plane, based upon said F-number signal, said optical characteristic signal and said fixed F-number of said detecting optical system, when the optimum image plane positioned by the detecting optical system is substantially coincident with said predetermined surface; and (f) means for correcting said positional signal to a signal indicating positional relation in the optical-axis direction between said optimum image plane positioned by said photographic optical system and said film plane dependent upon said distance signal.

2. A camera system according to claim 1, wherein said distance signal producing means includes means for storing a distance signal for the F-numbers of said photographic optical system in the optical-axis direction between the optimum image plane of the object positioned by said photographic optical system and said film plane when the optimum image plane of the object by said detecting optical system substantially coincides with said predetermined surface.

3. A camera system according to claim 2, wherein said distance signal producing means includes means for reading a distance signal from said memory means in response to said F-number signal and said optical characteristic signal.

4. A camera system according to claim 1, wherein said lens barrel includes means for generating an output of information concerning said optical characteristics of said photographic optical system.

5. A camera system according to claim 1, wherein said optical characteristics include characteristics of spherical aberration in said photographic optical system.

6. A camera system according to claim 1, wherein said lens barrel includes means for producing an output of information relative to the minimum F-number and the focal length of said photographic optical system and wherein said optical characteristics detecting means includes means for forming said optical characteristic signal based upon the output of said information producing means.

7. A camera system according to claim 1, wherein said correcting means includes means for adding said distance signal formed by said producing means to said positional signal.

8. In a camera system having an interchangeable lens barrel including therein a photographic optical system for positioning an optimum image plane of an object to be photographed by visible light in coincidence with a film plane, said optical system having optical characteristics in which the position of the optimum image plane varies in the direction of the optical axis depending on the F-number of the photographic optical system and on the wavelength of light, and wherein a diaphragm aperture of the photographic optical system is reduced to a controlled F-number in response to a shutter releasing operation, an improvement comprising:

(a) a detecting optical system which is located rearwards of said photographic optical system for positioning the optimum image plane of the object on a predetermined surface, the detecting optical system having a fixed F-number:

(b) focal point detecting means for detecting the positional relation between said predetermined surface and the optimum image plane of the object positioned by said detecting optical system, and by light in a predetermined wavelength range including light other than visible light, based upon a focused condition where the image of the object is formed on said predetermined surface by the light in said predetermined wavelength range, the focal point detecting means generating a positional signal representing the detected positional relation;

(c) means for detecting said controlled F-number of said photographic optical system to produce an F-number signal dependent upon the detected F-number;

(d) means for detecting said optical characteristics to produce an optical characteristic signal dependent upon said detected optical characteristics;

(e) means for producing a distance signal representing the distance in the optical-axis direction between the optimum image plane of the object positioned by said photographic optical system at the controlled F-number and said film plane, based upon said F-number signal, said optical characteristic signal and said fixed F-number of said detecting optical system, when the optimum image plane positioned by the detecting optical system and by the light in said predetermined wavelength range is substantially coincident with said predetermined surface; and (f) means for correcting said positional signal to a signal indicating positional relation in the optical axis direction between said optimum image plane positioned by said photographic optical system and said film plane dependent upon said distance signal.

9. In a camera including a photographic optical system for positioning an optimum image plane of an object to be photographed on a predetermined surface, said optical system having optical characteristics in which the position of the optimum image plane varies in the direction of the optical axis depending on the F- number of the photographic optical system, and wherein a diaphragm aperture of the photographic optical system is reduced to a controlled F-number in response to a shutter releasing operation, an improvement comprising:

(a) a detecting optical system which is located rearwards of said photographic optical system, the detecting optical system having a fixed F-number;

(b) focal point detecting means which has a detecting surface for receiving light from the object through said detecting optical system and which detects the positional relation between the optimum image plane of the object positioned by said detecting optical system and said detecting surface, based upon a focused condition where the image of the object is formed on said detecting surface, the focal point detecting means generating a positional signal representing the detected positional relation;

(c) means for detecting said controlled F-number of said photographic optical system to produce an F-number signal dependent upon the detected F-number;

(d) means for detecting said optical characteristics to produce an optical characteristic signal dependent upon said detected optical characteristics;

(e) means for producing a distance signal representing the distance in the optical-axis direction between the optimum image plane of the object positioned by said photographic optical system at the controlled F-number and said predetermined surface, based upon said F-number signal, said optical characteristic signal and said fixed F-number of said detecting optical system, when the optimum image plane positioned by the detecting optical system is substantially coincident with said detection surface; and (f) means for correcting said positional signal to a signal indicating positional relation in the optical axis direction between said optimum image plane positioned by said photographic optical system and said predetermined surface dependent upon said distance signal.

10. In a camera including a photographic optical system for positioning an optimum image plane of an object to be photographed by visible light on a predetermined surface, said optical system having optical characteristics in which the position of the optimum image plane varies in the direction of the optical axis depending on the F-number of the photographic optical system and on wavelength of light, and wherein a diaphragm aperture of the photographic optical system is reduced to a controlled F-number in response to a shutter releasing operation, an improvement comprising:

(a) a detecting optical system which is located rearwards of said photographic optical system, the detecting optical system having a fixed F-number;

(b) focal point detecting means which has a detecting surface for receiving light from the object through said detecting optical system and which detects the positional relation between said detecting surface and said optimum image plane of the object positioned by said detecting optical system, and by light in a predetermined wavelength range including light other than visible light, the focal point detecting means generating a positional signal representing the detected positional relation;

(c) means for detecting said controlled F-number of said photographic optical system to produce an F-number signal dependent upon the detected F-number;

(d) means for detecting said optical characteristics to produce an optical characteristic signal dependent upon said detected optical characteristics;

(e) means for producing a distance signal representing the distance in the optical-axis direction between the optimum image plane of the object positioned by said photographic optical system at the controlled F-number and said predetermined surface, based upon said F-number signal, said optical characteristic signal and said fixed F-number of said detecting optical system, when the optimum image plane positioned by the detecting optical system and by the light in said predetermined wavelength range is substantially coincident with said detecting surface; and (f) means for correcting said positional signal to a signal indicating positional relation in the optical-axis direction between said optimum plane positioned by said photographic optical system and said predetermined surface dependent upon said distance signal.

* * * * *